Nov. 28, 1933.   J. H. STEDMAN   1,936,775
RUBBER KNOB AND METHOD OF MAKING
Filed Oct. 18, 1929   2 Sheets-Sheet 1
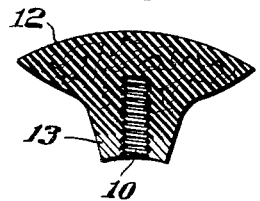
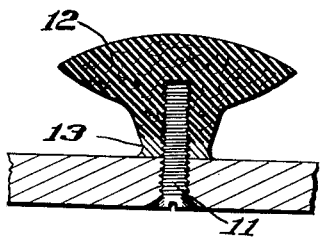
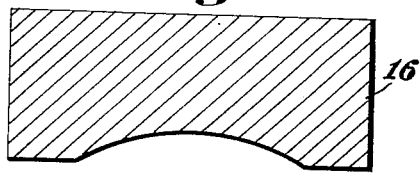
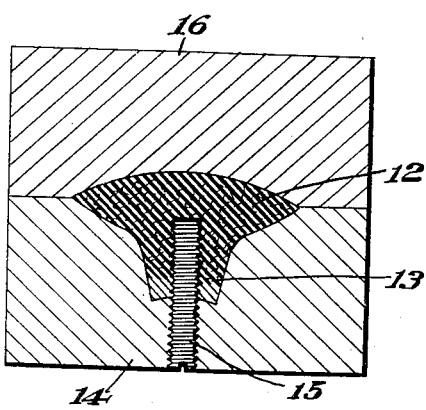
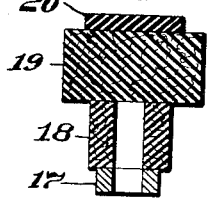
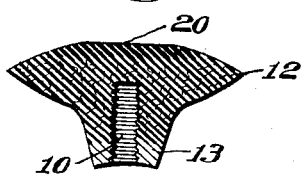

Nov. 28, 1933.    J. H. STEDMAN    1,936,775
RUBBER KNOB AND METHOD OF MAKING
Filed Oct. 18, 1929    2 Sheets-Sheet 2
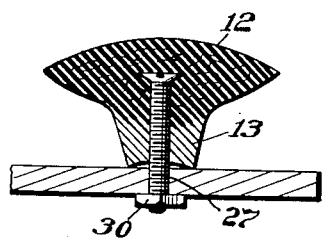
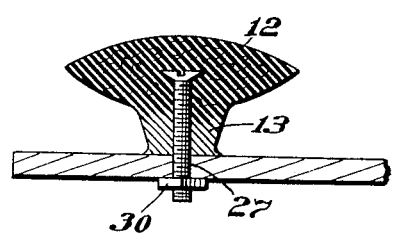
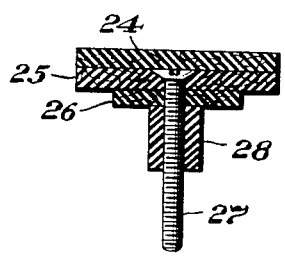
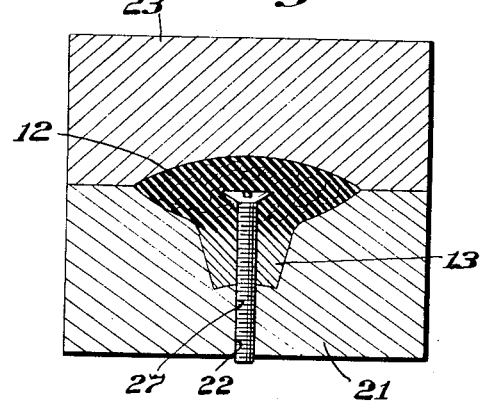
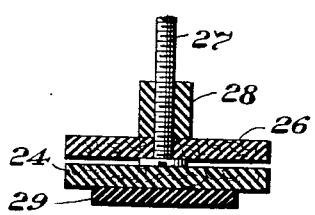
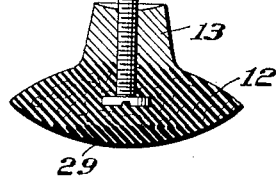
INVENTOR
James H. Stedman
BY Warren G. Ogden
his ATTORNEY Patented Nov. 28, 1933

1,936,775

UNITED STATES PATENT OFFICE 1,936,775

RUBBER KNOB AND METHOD OF MAKING

James H. Stedman, Braintree, Mass.

Application October 18, 1929. Serial No. 400,518

6 Claims. (Cl. 18—59)

My invention relates to knobs for household use and more particularly to knobs for furniture such as pulls for drawers and feet for beds, tables and chairs to facilitate moving without marring floors. The present application is a continuation in part and as to all common subject matter of my copending application Serial No. 273,682.

Heretofore knobs for the purposes named have been made from metal, glass and various compositions all of which have certain disadvantages familiar to householders, for example rapid tarnishing or rusting in the case of metal, and liability to fracture or chipping in the case of glass and compositions. The hard materials heretofore generally employed are liable, after a time, to loosen on the screw threads which secure them to the face of the drawer, door or other support due to the inability of the material to obtain a sufficient frictional grip on the support.

The principal object of my invention is to manufacture a knob, or the like, from material that overcomes the disadvantages heretofore encountered and especially that of loosening on the support during use. Accordingly my knob is molded from rubber in such a manner that the outer or grasping portion is of a hardness to withstand hard usage without damage, and the inner support-contacting portion is of relatively softer rubber enabling it to yield and spread circumferentially to obtain a tight grip on the support under axial anchoring compression.

A further object of my invention is to produce a satisfactory knob from material that may be worked in a great number of colors and combinations of colors so as to match or blend with surrounding furnishings or interior decorative effects. By the use of colored rubber, either plain or variegated colors, this object may be successfully achieved. Furthermore the surface of the harder, grasping portion of the knob may be separately decorated or ornamented with an inlay in any desired shape or form. This inlay is preferably formed of pre-vulcanized rubber that provides an extremely hard wear surface on the exposed knob end. In this form, the knob may be used to advantage as a pad or foot for furniture legs or as a stop or bumper for doors.

To the accomplishment of these objects and such others as may hereinafter appear from the following description, as will readily be understood by those skilled in the art, my invention comprises the features of construction and process of manufacture hereinafter described and then particularly pointed out in the appended claims.

The preferred forms of my invention, in order to attain the objects above referred to, are illustrated in the accompanying drawings, in which:

Figure 1 is a sectional view of the preferred form of the knob before being applied to a support;

Fig. 2 is a similar view showing the same knob as it appears when fastened to a support;

Fig. 3 illustrates, in section, the assembly of the rubber pieces preparatory to molding;

Fig. 4 illustrates a closed mold, in section, with the rubber pieces flowed to shape by the molding pressure;

Fig. 5 shows, in section, an assemblage of rubber pieces for producing an ornamental or a harder exposed end on the knob;

Fig. 6 is a sectional view of a knob made from the pieces shown in Fig. 5 and from a mold that produced a flat-ended knob;

Figs. 7 and 8 are sectional views, of a modified form of the knob in which the anchoring screw is embedded in the rubber, showing the knob before and then after tightening to the support;

Figs. 9 and 10 illustrate, in section, one manner of assembling the rubber pieces to produce the knob shown in Fig. 7, and these pieces within a closed mold;

Fig. 11 is a sectional view of the constituent rubber pieces to produce the knob shown in Fig. 7 but modified by the provision of a pre-vulcanized rubber insert; and Fig. 12 is a view, in section, molded from the parts shown in Fig. 11.

In the embodiment of the invention illustrated in Figs. 1 to 4, inclusive, a knob of conventional shape is illustrated provided with a central threaded bore 10 extending axially through the shank and into the body of the knob, this threaded bore being adapted to receive a fastening-screw 11 which, more advantageously, should have a greater pitch diameter than that of the bore 10 to prevent rotation of the knob thereon. The enlarged outer or grasping portion 12 of the knob is made of relatively hard or less resilient rubber, while the inner portion or shank 13 of the knob (i. e., the portion which bears against the face of the drawer) is made of relatively soft rubber, so as to adapt it to yield when the fastening-screw is tightened up. On tightening the screw, the soft-rubber shank 13 is axially compressed and its contacting end is drawn against the outer face of the drawer by yielding pressure, thus serving to exert a constant pull that will keep the fastening-screw tight, with the end of the shank pressed tightly against the drawer face, thus serving as a lock-nut. It is desirable that the end-face of the shank 13 shall be more or less concaved, so that, when the nut is tightened, this concaved face will flatten out against the surface of the drawer, thereby providing for expansion of the contacting end without appreciably distorting the shank.

The making of the outer, grasping part of the knob of harder rubber provides a firm grasping-member and at the same time insures a firm anchorage for the holding-screw.

In the process of manufacture I provide the shank-molding portion 14 (Fig. 3) of a two-part mold with a screw 15 removably mounted centrally of the mold cavity. About this mold screw I assemble a plurality of pieces of uncured rubber, this having been found satisfactory in practice for making the simpler form of knob, of such proportions that when the head-molding portion 16 of the two-part mold is closed upon them they will flow sufficiently to completely fill the mold, as shown by Fig. 4. The first piece 17, that will form the inner or support-contacting portion of the knob, is of relatively soft rubber, while the second and third pieces 18 and 19 are of relatively hard rubber. The pieces 17 and 18 may be perforated disks or cylinders to slip easily over the screw threads or they may be in the form of a strip wrapped about the screw shank.

After shaping the pieces 17, 18, 19 to the desired form and also vulcanizing, see Fig. 4, the screw 15 is withdrawn and a knob is produced having an axial threaded bore and a relatively soft contacting end as shown in Figs. 1 and 2.

Referring now to the feature of the knob that is shown in Figs. 5 and 6 the process of production is the same as just described except that on top of the rubber piece 19 I lay an additional piece 20 of pre-vulcanized rubber. In the molding operation the pre-vulcanized piece 20 becomes inlaid in the piece 19, which is softer because uncured thus providing an extremely hard wear surface after vulcanization has taken place. If desired the cavity of the head-molding portion of the two-part mold may be shaped to provide a flat exposed knob end adapted for use on chair and table legs. Preferably, when the knob is used on chairs and tables, the piece 20 is cut from rubber stock, such as rubber flooring, that has been subjected during the vulcanizing process to an excessive pressure so that it has wearing qualities far in excess of the remainder of the rubber in the knob.

The modified form of the knob shown in Figs. 7 to 10 has the same characteristic features of a relatively harder grasping portion 12 and a relatively softer support-contacting portion 13 and is produced by a process similar in principle to that which produces the knob of Figs. 1 to 4. The distinction resides in having the knob provided with an anchoring screw as an integral part thereof forming what I call the "male" type of knob as distinguished from the centrally threaded or "female" type heretofore described.

In producing the male type knob the mold part 21 has no central screw but merely a screw receiving hole 22 (Fig. 10). The mold part 23 is unchanged. The constituent parts 24, 25, 26 (Fig. 9) forming the grasping portion of the knob are mounted upon and around the head, which may be of any desired shape, of a screw 27. The piece 28 of softer uncured rubber, forming the shank of the knob, is placed on the shank of the screw below the harder pieces about the head of the screw. The assemblage is then placed within the cavity of the mold part 21, the uncovered portion of the screw being received in the hole 22. After molding and vulcanizing the head of the screw will be embedded in the harder portion of the knob, to thus securely and permanently anchor it therein.

The male type may be produced with the extremely hard wear surface as described for the female type by adding a piece 29 of pre-vulcanized rubber (see Figs. 11 and 12) outside the piece which lies across the screwhead.

To secure this male type to the front of a drawer or other support, a nut 30 (Figs. 1 and 2) is threaded on the projecting end of the screw 27. On tightening this nut the softer inner or contacting portion 13 of the knob is spread slightly and yieldingly held against the support serving as a lock-nut as heretofore described.

It has been found in practice that a material having all the desired characteristics for the body portion of the knob is rubber reinforced with cotton fibre. Reinforced rubber color stocks may be mixed as taught by my Letters Patent of the United States No. 1,482,952, dated February 5, 1924 to produce a variegated surface in such tints, hues or markings as may be required, or an inlay of a single color, or white or black in any outline desired may be employed to gain a desired ornamental effect.

While it is preferred to employ the specific construction and arrangement of parts shown and described it will be understood that this construction is not essential except so far as specified in the claims, and may be changed or modified without departing from the broader features of the invention.

What is claimed as new, is:—

1. A rubber knob having its enlarged outer or grasping portion of relatively harder rubber and its smaller support-contacting portion of a relatively softer rubber, and provided with an axial bore extending through the softer rubber and threaded substantially into the harder rubber for receiving an anchoring screw, whereby said support-contacting portion will yield under axial anchoring compression and spread circumferentially against the surface to be contacted.

2. A knob consisting of rubber having the headed end of its fastening or anchoring screw embedded therein, the enlarged portion of the knob being of relatively harder rubber and the support-contacting portion of the shank being of relatively softer rubber to yield when a nut on the screw is tightened, said screw having one end secured in the relatively harder rubber portion and extending outwardly through the softer rubber shank portion.

3. A knob consisting of rubber having the headed end of its fastening or anchoring screw embedded therein, the enlarged portion of the knob being of relatively harder rubber and the support-contacting portion of the shank being of relatively softer rubber to yield when a nut on the screw is tightened, the end face of said shank being concaved, said screw having one end secured in the relatively harder rubber portion and extending outwardly through the softer rubber shank portion.

4. A knob consisting of rubber having the headed end of its fastening or anchoring screw embedded therein, said knob having an enlarged portion of relatively harder rubber the central portion of which comprises a piece of vulcanized rubber embedded therein, and a support-contacting portion of relatively softer rubber molded about the shank of said anchoring screw.

5. A rubber knob having its enlarged outer or grasping portion of relatively harder rubber and its smaller support-contacting portion of relatively softer rubber, whereby said support-contacting portion will yield under axial anchoring compression and spread circumferentially against the surface to be contacted, the enlarged grasping portion having an inlay in its outer face that is harder than the rubber which surrounds it.

6. The method of manufacturing knobs which comprises arranging a plurality of pieces of rubber about one end of a screw, at least one piece lying across said end of the screw and the remainder surrounding the shank of the screw, the outer piece being of relatively harder uncured rubber and the innermost piece on the shank of the screw being of relatively softer uncured rubber, and then molding and vulcanizing said pieces to knob shape under pressure and heat while thus associated with the screw to produce a knob having a harder outer or grasping portion, an elastic inner or support-contacting portion, and a threaded screw-receiving portion extending through the elastic portion substantially into the grasping portion.

JAMES H. STEDMAN.